(No Model.)
C. MARCHAND.
TREATMENT OF RANCID BUTTER AND OTHER MATERIALS.
No. 338,538. Patented Mar. 23, 1886.
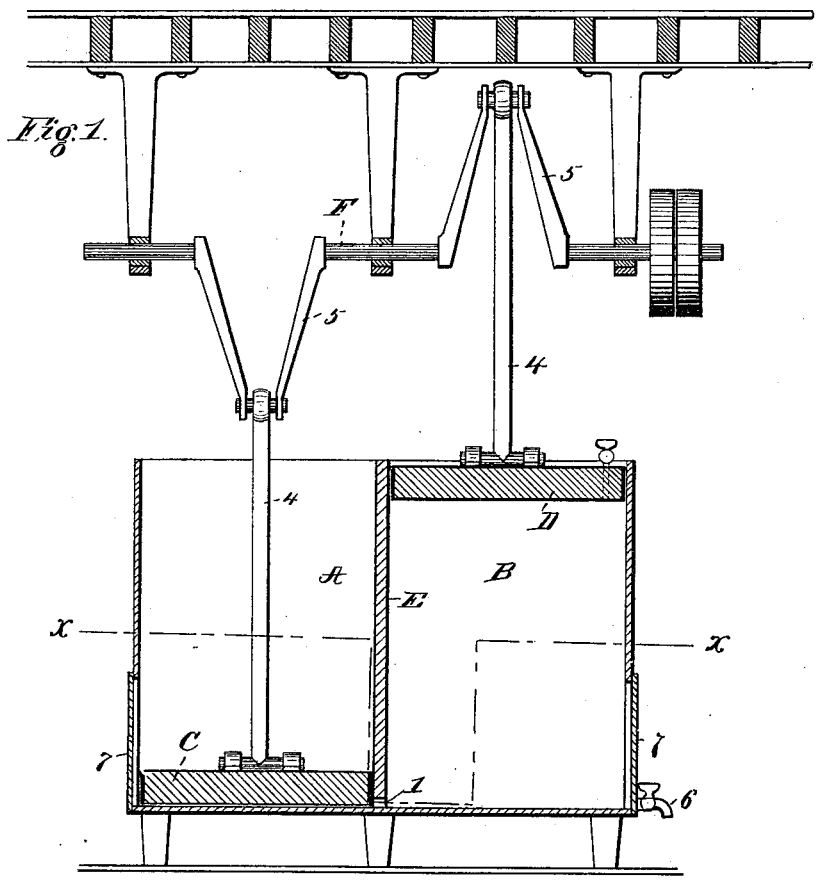
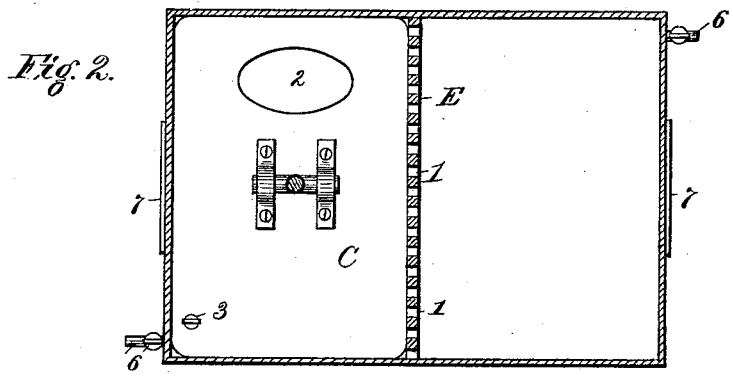

UNITED STATES PATENT OFFICE.

CHARLES MARCHAND, OF NEW YORK, N. Y.

TREATMENT OF RANCID BUTTER AND OTHER MATERIALS.

SPECIFICATION forming part of Letters Patent No. 338,538, dated March 23, 1886.

Application filed December 29, 1885. Serial No. 187,064. (No specimens.)

*To all whom it may concern:*

Be it known that I, CHARLES MARCHAND, of New York city, in the county and State of New York, have invented a new and useful Improvement in Treatment of Rancid Butter and other Materials, which improvement is fully set forth in the following specification.

This invention relates more particularly to the treatment of rancid butter, or butter of which the commercial value is lessened by unwholesome impurities contained in it.

Heretofore a number of chemical processes more or less perfect have been devised for the purification of rancid butter, but the mechanical operation of mixing the butter with the chemicals has been so performed as to destroy the grain of the butter. Heretofore the butter and chemicals have been churned together, and the grain under these conditions is very soon destroyed, so that while the rancidity is removed a greasy appearance is given which renders the product unsalable.

The present invention enables the butter and chemicals to be brought into intimate contact without destroying the grain or appearance of the butter. It is based upon the fact that butter can be subjected to a moderate pressure while a temperature of between fifty-seven (57°) and sixty-two (62°) degrees Fahrenheit, and can be worked under these conditions so long as the chemical treatment renders necessary. A temperature of sixty (60°) degrees Fahrenheit gives, according to my experience, the best results.

The invention consists in bringing the butter and chemical together by squeezing the butter through an opening or openings repeatedly, if desired, so that it is subdivided and all parts brought into contact with the chemical. Moderate pressure is employed, less than suffices to break or destroy the granules, and about the temperature named is maintained during the operation.

The invention also consists in a process of treating butter, fat, or other plastic material with a liquid for purification, washing, flavoring, or other purpose by repeatedly expressing or squeezing the plastic material through one or more openings into the liquid, so as constantly to expose new surfaces to the liquid. Preferably the expressed material, if lighter than water, enters the liquid at or near the bottom, so that it will rise through the liquid, and thus a more thorough admixture of the two materials be effected.

While this part of the invention is not limited to any special conditions of temperature and pressure, yet where butter is to be treated the conditions above mentioned would naturally be employed in order to preserve the grain.

The invention further comprises a special apparatus for carrying out the before-mentioned process. This apparatus consists of two chambers communicating with each other at the bottom by means of a series of small openings or tubes, and pistons in said chambers for forcing the material alternately from one chamber into the other through the said openings or tubes. The pistons are connected so that they move in opposite directions. A series of openings is considered better than a single tube set with knives or rollers, since the butter or other material after it has passed a knife or roller, being still confined in the tube, will or is apt to reunite and form a comparatively large stream, whereas with a series of tubes or openings it enters the other chamber in numerous small streams, and a much larger surface is exposed.

While it is preferred to use this new apparatus in carrying the new process into effect, the novelty of the process is not dependent upon the novelty of the apparatus, and the invention, so far as it relates to the process, is not restricted to this special form of apparatus.

Certain special combinations of parts in the apparatus, hereinafter set forth, also form part of the invention.

In the accompanying drawings, which form a part of this specification, Figure 1 is a vertical section of an apparatus constructed in accordance with the invention, and Fig. 2 a horizontal section on line *x x*, Fig. 1.

The two chambers A and B may be square, oblong, circular, oval, or of other suitable form in plan, but are shown as square, and the pistons C D, which work in the chambers, correspond with them in form. The chambers are separated by a partition, E, provided at the bottom with one or more lines of holes, 1, which form a communication between the chambers. Each piston is provided with a man-hole, 2, a pipe, 3, having a stop-cock, and a pitman, 4, connecting it with a crank, 5, of the shaft F. The two cranks are placed diametrically opposite, so that the pistons move in opposite directions. The man-hole is for the purpose of introducing the solid material and also the liquid at the beginning of the operation into the chamber, and should be large enough to permit a man to pass through the same. The pipe 3 is for admitting materials during the operation without requiring the man-hole to be opened. Each chamber is provided at its lower part with a pipe, 6, and stop-cock, for drawing off its liquid contents, and also with a door, 7, for withdrawing the solid materials. The two chambers can be placed in a reservoir of water maintained at 57° to 62° degrees Fahrenheit; but it is better to regulate the temperature of the room in which the apparatus is placed, maintaining it constant within the limits given.

The operation is as follows: One of the pistons being in the upper part of its chamber, the latter is filled with the rancid butter and the chemical liquid for treating the same, both at a temperature of 57° to 62° Fahrenheit. The man-hole being closed hermetically, and the other opening being closed also, the shaft F is slowly revolved. The pistons C D alternately rise and descend, and the butter and chemicals are forced from one chamber to the other through the openings 1. The masses of butter will naturally float upon the liquid, and the bulk of the latter will therefore be transferred from one chamber to the other in advance of the butter, which, being afterward expressed or squeezed through the openings in the partition, enters the liquid at the bottom in numerous small streams. From time to time the pieces of butter become detached and rise through the liquid to the surface of the same. By repeated passage from one chamber to the other the butter becomes thoroughly impregnated with the chemical, by which its rancidity is destroyed or the unwholesome properties removed. Thus, without rotation or any concussion analogous to that of churning, a thorough subdivision of the mass and the constant exposure of fresh surfaces to the action of the treating liquid is obtained without material injury to the grain, the appearance, or the consistency of the butter.

The following details, which are given merely by way of illustration, as they admit of indefinite variation, may be adopted in carrying out the process. A charge of one thousand (1,000) pounds of rancid butter may be treated with one hundred and fifty gallons of a suitable liquid—say one of the liquids heretofore used or proposed for purifying rancid butter—although whether a new or an old liquid is used is not material. From one to two hundred (100 to 200) holes, each one-eighth ($\frac{1}{8}$) of an inch in diameter, may be made in the partition, and pistons having an area of three to four (3 to 4) square feet on each face may be reciprocated through a distance of three feet six inches to four feet (3 ft. 6 in. to 4 ft.) at the rate of six to twelve (6 to 12) complete reciprocations a minute. The treatment is to be continued until the desired result is obtained—say from half an hour to an hour—in order to secure a thorough impregnation of the butter with the chemical agent. During the operation the temperature is maintained at the before-mentioned temperature, so that the butter is not altered. When the operation is finished, the liquid is drawn off by one of the pipes 6, and the butter removed through one of the doors 7. The butter is then placed on an inclined table and allowed to drain for, say, three to four hours, by which time the chemical agents will ordinarily have completely effected the purification. The butter is then returned to the apparatus shown, water at, say, sixty degrees (60°) Fahrenheit is introduced, and the butter is expressed from one chamber into the other, so that all parts are completely washed and all or nearly all traces of the foreign matters removed. The washing is or may be repeated with fresh water until the desired state of purity is obtained. After the washing is complete the liquid is drawn off through one of the pipes 6, and buttermilk or sour milk from which the butter has been removed is introduced. The pistons are then set in motion again, and the butter is worked for, say, half an hour. This operation gives the flavor of fresh butter to the product. The buttermilk is then drawn off, water is introduced, and the butter is washed therein, and, finally, the water which will not drain from the butter is removed by a butter-worker of any ordinary or suitable construction.

The same apparatus, and to a certain extent the same process, may be applied to the purification of fats of all kinds—say, in the manufacture of oleomargarine, and also to the mixing of the constituents of oleomargarine and other artificial butter compounds and to other uses. By the use of the same the ingredients may be mixed at a low temperature, which results in a considerable improvement in the quality of the products.

It will be understood that the use of the apparatus and process, or either of them in whole or in any new part, is within the invention, whether it be for one operation (as for treating with chemicals or washing or mixing alone) or for several operations.

Having now fully described my said invention and the manner in which the same is or may be carried into effect, what I claim is—

1. In the treatment or manufacture of butter, butter compounds, and products resembling butter, the improvement in purifying, by chemicals, washing, impregnating with buttermilk, or flavoring, mixing, or the like operation, consisting in expressing or squeezing the butter, butter compound, or fat alternately from one vessel into another, through one or more openings for that purpose therein provided under moderate pressure, and at about the temperature named, so that the grain is preserved, substantially as described.

2. The process of treating butter or fat with a liquid for purification, washing, flavoring, or other purpose by repeatedly expressing or squeezing the said material from one vessel into another containing the liquid through one or more openings provided in the vessels for that purpose, so that new surfaces of such material shall be constantly exposed to the action of said liquid, substantially as described.

3. The process of subjecting butter or fat to the action of any liquid by which it is to be treated, by repeatedly expressing or squeezing the butter or fat from one vessel into another containing the said liquid through one or more openings provided for that purpose at or near the bottom of the said vessels, so that the butter or fat may rise through the said liquid, substantially as described.

4. The chambers communicating with each other through a series of separate openings or tubes, in combination with the pistons for passing the material from one chamber to the other through said openings or tubes, substantially as described.

5. The chambers placed side by side and separated by a partition having at the bottom a row of holes, through which the chambers communicate, in combination with the pistons, substantially as described.

6. The combination of the communicating chambers provided with doors for removing the solid material, and pipes for drawing off the liquid, and the connected pistons provided with man-holes, substantially as described.

7. The combination, with the chambers separated by a partition perforated at the bottom, of the pistons, the pitmen, and the double crank-shaft, substantially as described.

In testimony whereof I have signed this specification in presence of two subscribing witnesses.

CHAS. MARCHAND.

Witnesses:
C. PFENDER,
D. W. C. WHEELER, Jr.